United States Patent
Kato et al.

[11] Patent Number: 5,299,390
[45] Date of Patent: Apr. 5, 1994

[54] METHOD AND APPARATUS FOR LAPPING A PAIR OF GEARS

[75] Inventors: Shogo Kato, Nagoya; Naotoshi Sato, Aichi, both of Japan

[73] Assignees: Toyota Jidosha Kabushiki Kaisha, Aichi; Yutaka Seimitsu Kogyo, Ltd., Saitama, both of Japan

[21] Appl. No.: 92,561

[22] Filed: Jul. 16, 1993

Related U.S. Application Data

[63] Continuation of Ser. No. 855,560, Mar. 23, 1992, abandoned.

[30] Foreign Application Priority Data

Apr. 11, 1991 [JP] Japan .................. 3-106769

[51] Int. Cl.$^5$ .................. B24B 49/10; B24B 51/00
[52] U.S. Cl. .................. 51/165.76; 51/287;
    51/105 GG; 51/134 SR; 51/165.77
[58] Field of Search ........ 51/105 GG, 165.71, 165.74,
    51/165.76, 165.77, 134 SR, 287, DIG. 1; 409/2, 4, 38

[56] References Cited

U.S. PATENT DOCUMENTS

| | | | |
|---|---|---|---|
| 3,254,566 | 6/1966 | Bradner | 409/2 |
| 3,874,267 | 4/1975 | Schwenke | 409/2 |
| 4,617,761 | 10/1986 | Miyatake | 51/165.71 |
| 4,689,918 | 9/1987 | Loos | 51/105 GG |
| 4,982,532 | 1/1991 | Hosoya | 51/287 |
| 5,044,127 | 9/1991 | Ryan | 51/DIG. 1 |

FOREIGN PATENT DOCUMENTS

| | | | |
|---|---|---|---|
| 48304 | 4/1983 | Fed. Rep. of Germany | 409/2 |
| 3730249A1 | 4/1989 | Fed. Rep. of Germany . | |
| 48811 | 11/1988 | Japan | 409/2 |
| 64-51222 | 2/1989 | Japan . | |
| 64-64718 | 3/1989 | Japan . | |
| 1-97520 | 4/1989 | Japan . | |
| 1-188222 | 7/1989 | Japan . | |
| 1-188223 | 7/1989 | Japan . | |
| 643256 | 1/1979 | U.S.S.R. | 51/105 CG |
| 660791 | 5/1979 | U.S.S.R. | 51/105 CG |
| 1407708 | 7/1988 | U.S.S.R. | 409/2 |

OTHER PUBLICATIONS

German Patent Office Official Letter dated Jun. 1, 1992.

*Primary Examiner*—Bruce M. Kisliuk
*Assistant Examiner*—Bo Bounkong
*Attorney, Agent, or Firm*—Finnegan, Henderson, Farabow, Garrett and Dunner

[57] ABSTRACT

A method of lapping teeth of a pair of gears by positively rotating one of the pair of gears at a predetermined constant speed, in mesh with the other gear in the presence of a lapping powder, while applying a braking torque to the other gear. The braking torque is controlled such that the braking torque is smaller at least when an angular acceleration value of the above-indicated other gear is maximum, than when the angular acceleration value is minimum. Also disposed is an apparatus for practicing the method.

13 Claims, 4 Drawing Sheets

MAXIMUM CUMULATIVE PITCH ERROR BEFORE LAPPING

METHOD AND APPARATUS FOR LAPPING A PAIR OF GEARS

This application is a continuation of application Ser. No. 07/855,560 filed Mar. 23, 1992, now abandoned.

BACKGROUND OF THE INVENTION

1. Field of the Invention

The present invention relates in general to a method and an apparatus for lapping teeth of a pair of gears, and more particularly, to such lapping method and apparatus which permit lapping of the gears so as to reduce an error of the gears which occurred during fabrication of the gears.

2. Discussion of the Prior Art

Lapping is a conventional process for finishing the tooth surfaces of a pair of gears which are used in mesh with each other. An example of such a gear lapping process is disclosed in Publication No. 1-97520 of unexamined Japanese Patent Application, in which one of a pair of gears is positively driven at a predetermined speed, in mesh with the other gear, in the presence of a suitable abrasive lapping compound or powder between the gears, while a braking torque is applied to the above-indicated other gear, so that the surfaces of the gear teeth are lapped with the lapping powder, for improved smoothness of the tooth surfaces.

However, the conventional lapping process as described above suffers from a drawback where one or both of the two gears has/have considerable geometrical or dimensional errors such as eccentricity of the pitch circle with respect to the axis of the gears, which are caused during fabrication or generation of the gears. Namely, the amount of an error of the gear or gears after the finish lapping operation may be larger than that before the finish lapping.

For example, the degree of eccentricity (eccentricity error) of a gear is reflected by the maximum cumulative pitch error of the gear or gears. A test showed an increase of the maximum cumulative pitch error after the finish lapping of a specimen gear, as compared with that before the finish lapping, as indicated by the graph of Fig. 7. The maximum cumulative pitch error was obtained as a difference between the maximum and minimum values of a cumulative pitch error which is a sum of individual pitch errors between the adjacent ones of the successive gear teeth. As the individual pitch errors are either a positive or a negative value, the cumulative pitch error changes in the circumferential direction of the gear. The increase in the maximum cumulative pitch error means an increase in the eccentricity error of the gear by the lapping operation.

As indicated above, a braking torque is applied to one (hereinafter referred to as "braked gear") of the two gears during a lapping operation with the gears rotated in mesh with each other. The increase in the eccentricity error of the lapped gear is considered to be caused by a change in the overall lapping torque of the braked gear, which change takes place due to the eccentricity error of the braked gear or the other gear before the lapping. The overall lapping torque of the brake gear is a sum of the braking torque TB, and an inertial torque based on the moment of inertia of the braked gear. In the conventional lapping method, the braking torque TB is held constant, but the inertial torque varies as the gears are rotated. The inertial torque is equal to $(I_G \cdot \alpha_G)$, where $I_G$ represents the moment of inertia, while $\alpha_G$ represents the angular acceleration value. Since the angular acceleration value $\alpha_G$ is at a minimum when the eccentricity error amount is at a maximum, and it is at a maximum when the eccentricity error amount is at a minimum, the inertial torque varies during rotation of the braked gear.

When the overall lapping torque is at a minimum with the maximum eccentricity error amount, the surface pressure of the contacting teeth of the meshing two gears is not enough for a sufficient amount of metal removal or lapping depth to correct or reduce the eccentricity error of, the gear or gears. When the overall lapping torque is at a maximum with the minimum eccentricity error amount, on the other hand, the surface pressure of the contacting gear teeth is excessive for an adequate amount of metal removal by the lapping. In the conventional lapping method, therefore, the change in the overall lapping torque during a lapping operation of the gears does not meet the change in the eccentricity error amount so as to assure an adequate control of the metal removal for reducing or eliminating the eccentricity of the gears. In other words, the gear teeth that should be lapped by a larger amount are lapped by a smaller amount, than the gear teeth that should be lapped by a smaller amount, whereby the maximum cumulative pitch error of the gears after the lapping tends to be larger than that before the lapping.

Similar drawbacks may be encountered due to a change in the overall lapping torque which arises from a dimensional or geometrical error of the gears other than the eccentricity error.

SUMMARY OF THE INVENTION

It is therefore a first object of the present invention to provide a method of lapping the teeth of a pair of gears, which permits reduction in the geometrical or dimensional errors of the gears.

A second object of the invention is to provide an apparatus suitable for practicing the lapping method indicated above.

The first object may be attained according to one aspect of the present invention, which provides a method of lapping teeth of a pair of gears by positively rotating one of the pair of gears at a predetermined constant speed, in mesh with the other gear in the presence of a lapping powder, while applying a braking torque to the other gear, the method comprising the step of controlling the braking torque such that the braking torque is smaller at least when an angular acceleration value of the above-indicated other gear is at a maximum, than when the angular acceleration value is at a minimum.

In the lapping method of the present invention, the two gears are rotated in mesh with each other at a constant speed, with an abrasive lapping powder supplied between the contacting gear teeth, while a braking torque applied to the negatively driven gear (braked gear). This braking torque is controlled based on the angular acceleration value of the braked gear which is directly detected or determined from the detected rotating angle or angular velocity of the braked gear. Namely, the braking torque is controlled such that the braking torque is smaller when the angular acceleration value is relatively large, than when the angular acceleration value is relatively small.

The present method is effective to at least reduce or prevent an increase in the geometrical or other errors of the gears after the lapping. Further, the present method makes it possible to reduce or eliminate the errors of the lapped gears, where the braking torque is adequately controlled. Thus, the lapping according to the present method assures improved geometrical and dimensional accuracy of the lapped gears.

For instance, the braking torque is controlled so as to decrease with an increase in the angular acceleration value of the braked gear, so that the overall lapping torque decreases, and consequently the surface pressure of the contacting gear teeth decreases with a decrease in the applied braking torque.

The braking torque may be controlled so as to produce a counter torque which offsets a change of an inertial torque produced by a moment of inertia of the braked gear, so that the lapping depth or amount of metal removal by the lapping is constant throughout the rotation of the gears, whereby an increase in the errors of the gears is avoided. Preferably, the braking pressure is controlled so as to produce a counter torque which changes with the inertial torque such that the direction of change of the counter torque is opposite to that of the inertial torque. According to this arrangement, the lapping depth is relatively large for the gear teeth whose error amount is relatively large, and vice versa, whereby the error of the gears may be reduced as the lapping progresses. In this case, if the amount of change of the counter torque is made equal to that of the inertial torque, the error can be eliminated.

However, decreasing the braking torque with the angular acceleration value is not essential. For example, the braking torque may be controlled to decrease by an amount proportional to the angular acceleration value when the angular acceleration value is higher than a predetermined upper limit, and increase by an amount proportional to the angular acceleration value when the angular acceleration value is lower than a predetermined lower limit. In essence, an increase of the errors of the lapped gears can be reduced or at least prevented, as long as the braking torque is controlled such that it is smaller at least when the angular acceleration value is at a maximum, than when the angular acceleration value is at a minimum.

The second object indicated above may be attained according to a second aspect of this invention, which provides an apparatus for lapping teeth of a pair of gears, comprising: (a) support means for rotatably supporting the pair of gears in mesh with each other; (b) braking means for applying a braking torque to one of the pair of gears; (c) drive means for positively rotating the other of the pair of gears at a predetermined speed; (d) supply means for supplying a lapping powder between the teeth of the pair of gears; and (e) control means for controlling the braking torque such that the braking torque is smaller at least when an angular acceleration value of the above-indicated one gear is at a maximum, than when the angular acceleration value is minimum.

BRIEF DESCRIPTION OF THE DRAWINGS

The above and optional objects, features and advantages of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
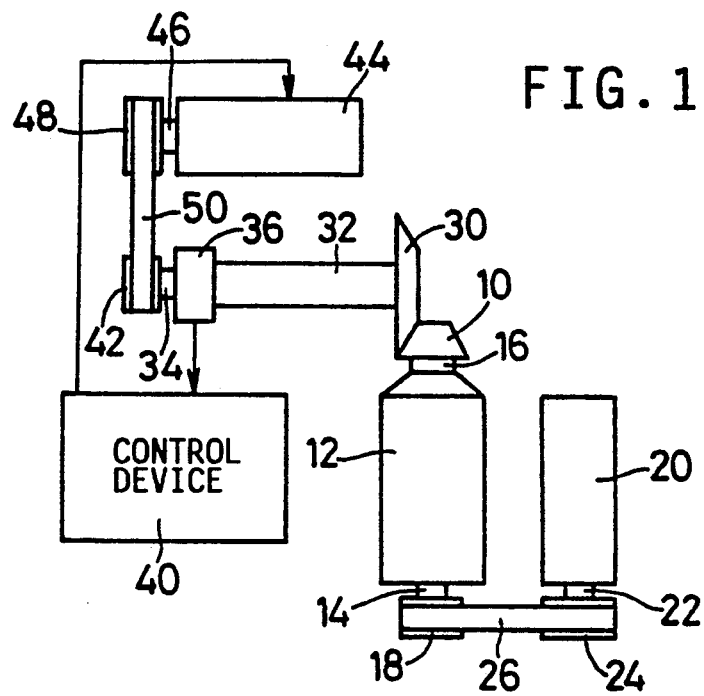
FIG. 1 is a schematic plan view of a gear lapping apparatus constructed to operate according to the principle of this invention.

Referring first to FIG. 1, reference numeral 10 denotes a pinion which is clamped by a chuck 16 attached to one end of a pinion spindle 14, so that the pinion 10 is rotated with the pinion spindle 14, which is rotatably supported by a spindle housing 12. The pinion spindle 14 has a pulley 18 fixed at its other end, so that the pulley 18 is rotated with the pinion spindle 14. A pinion drive motor 20 is disposed near the spindle housing 12. The motor 20 has a drive shaft 22 to which a pulley 24 is fixed for rotation with the drive shaft 22. The pulleys 18, 24 are connected by a belt 26, so that the pinion 10 is rotated by the motor 20, at a predetermined constant speed.

The pinion 10 is held in mesh with a gear 30. The pinion 10 and gear 30 are fabricated such that the teeth have suitable amounts of stock to be removed by lapping. The gear 30 is clamped by a chuck (not shown) attached to an end of a gear spindle 34 which is rotatably supported by a spindle housing 32. The gear 30 is rotated with the gear spindle 34, which is provided with a sensor 36 for detecting a rotating angle $\theta G$ of the gear 30. The signal indicative of the angle $\theta G$ generated by the sensor 36 is fed to a control device 40, so that an angular acceleration value of the gear 30 is calculated by the control device 40, on the basis of the signal.

The gear spindle 34 has a pulley 42 fixed at the other end, so that the pulley 42 is rotated with the spindle 34. A braking device 44 is disposed near the spindle housing 32, and has a drive shaft 46 having a pulley 48 fixed thereto. The pulleys 42, 48 are connected by a belt 50, so that a braking torque TB is applied to the gear 30, through the pulley 48, belt 50, pulley 42 and gear spindle 34. The braking device 44 is connected to the control device 40, so that the braking torque TB produced by the device 44 is controlled depending upon the angular acceleration value of the gear 30 which is calculated by the control device 40.

While a lapping apparatus has been described above, there will be described a lapping operation performed by the apparatus.

Initially, a suitable abrasive lapping powder or compound is supplied between the meshing pinion 10 and gear 30, from a supply device constructed as is well known in the art. The pinion drive motor 20 is then turned on to rotate the pinion and gear 10, 30 in mesh with each other. While the pinion 10 and gear 30 are rotated, the controlled braking torque TB is applied to the gear 30, and the control device 40 receives the signal from the sensor 36, which indicates the rotating angle $\theta G$ of the gear 30.

For convenience's sake, it is assumed that the pinion 10 as fabricated has an eccentricity error "ep", i.e., eccentricity of the pitch circle of the pinion 10 with respect to the axis of rotation of the pinion. Accordingly, the teeth of the pinion 10 each having some stock to be removed by lapping, and has a cumulative pitch error due to the eccentricity error "ep". Where the pinion 10 is rotated at a predetermined constant speed "np" (revolution per second), the rotating angle $\theta G$ of the gear 30 during a time duration of "t" seconds is expressed by the following equation (1):

$$\theta G = (2\pi \cdot np \cdot t + ep \sin 2\pi \cdot np \cdot t)/i \quad (1)$$

where, i = gear ratio of the gears 10, 30

Figure 2:
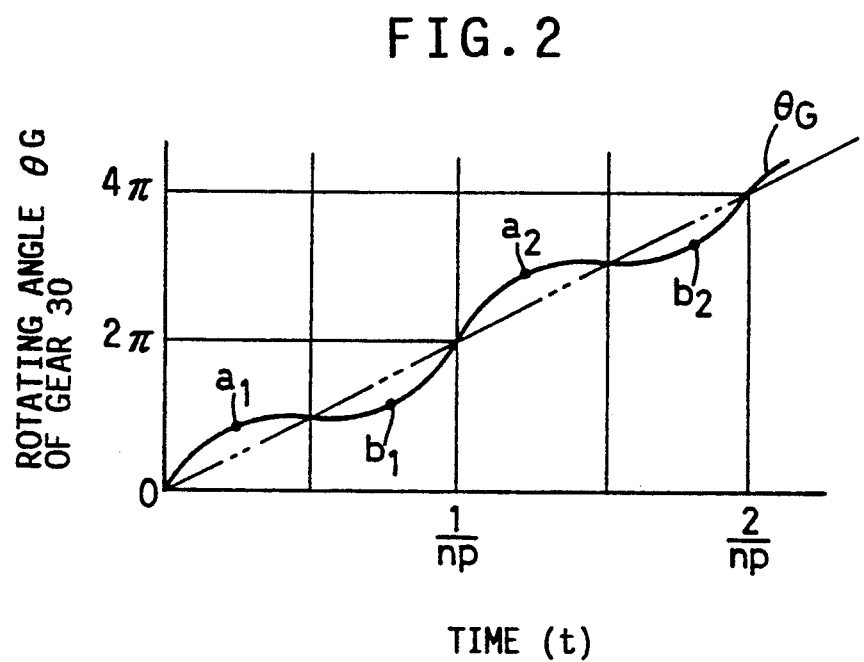
FIG. 2 is a graph indicating a change in the rotating angle of one of a pair of gears to be lapped by the apparatus of FIG. 1.

The relationship represented by the above equation (1) is illustrated in the graph of FIG. 2. In the graph, two-dot chain line indicates a linear increase at a constant gradient of the rotating angle $\theta G$ of the gear 30 as a function of time "t", where teeth of the the pinion 10 did not have an eccentricity error. In the presence of the cumulative pitch error of the pinion 10 due to the eccentricity error "ep", the rate of change of the rotating angle $\theta G$ of the gear 30 periodically varies at an interval corresponding to one revolution of the gear 30, as indicated by solid line in FIG. 2. In the graph, points $a_1$ and $a_2$ on the solid line (indicative of the rotating angle $\theta G$ of the gear 30) which are most distant from the two-dot chain line in the upward direction correspond to a circumferential toothed portion of the pinion 10 which has the maximum cumulative pitch error amount. Similarly, points $b_1$ and $b_2$ of the solid line which are most distant from the two-dot chain line in the downward direction correspond to a circumferential toothed portion of the pinion 10 which has the minimum cumulative pitch error amount.

The angular velocity $d\theta G/dt$ of the gear 30 is a first derivative of the angle $\theta G$ {represented by the above equation (1)} with respect to the time "t", while the angular acceleration value $d^2\theta G/dt^2$ of the gear 30 is a second derivative of the angle $\theta G$ with respect to the time "t". Therefore, the angular velocity $d\theta G/dt$ and the angular acceleration value $d^2\theta G/dt$, are represented by the following equations (2) and (3), respectively:

$$d\theta G/dt = \{2\pi \cdot np + ep(2\pi \cdot np)\cos 2\pi \cdot [np \cdot t]\}/i \quad (2)$$

$$d^2\theta G/dt^2 = -ep\{(2\pi \cdot np)^2 \sin 2\pi \cdot no \cdot t\}/i \quad (2)$$

It will be understood from the above equation (3) that the angular acceleration value is minimum at the points $a_1$, $a_2$ during each revolution of the pinion 10, and maximum at the points $b_1$, $b_2$ during each revolution.

The overall lapping torque TG of the gear 30 is expressed by the following equation (4):

$$TG = TB + IG(d^2\theta G/dt^2) \quad (4)$$

where, IG represents a moment of inertia of the gear 30, and $IG(d^2\theta G/dt^2)$ represents an inertial torque due to the moment of inertia IG.

The above equation (4) is converted into the following equation (5), by substituting the right member of the above equation (4) for $(d^2\theta G/dt^2)$ in the equation (4):

$$TG = TB - IG[-ep\{(2\pi \cdot np)^2 \sin 2\pi \cdot np \cdot t\}/i \quad (5)$$

Figure 6:
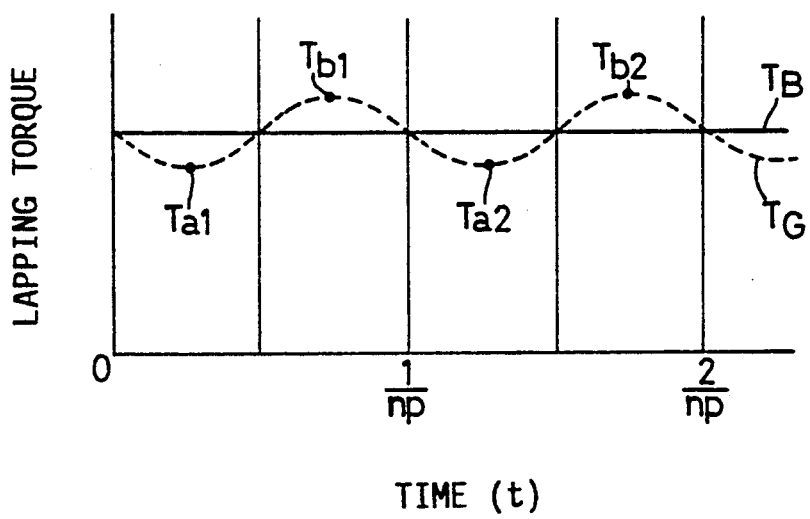
FIG. 6 is a graph showing a relationship corresponding to that of FIG. 3, according to a known lapping method.
Figure 7:
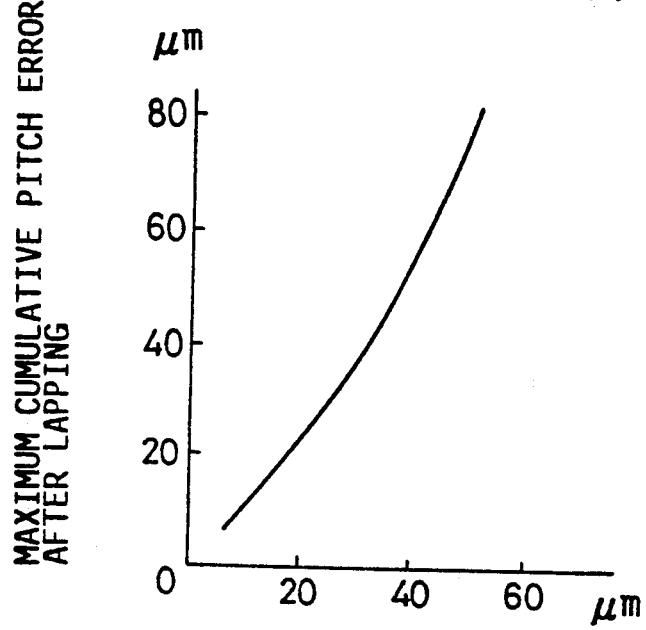
FIG. 7 is a graph indicating a maximum cumulative pitch error of a gear before and after the gear is lapped.

In the conventional lapping method in which the braking torque TB (produced by the braking device 44) is held constant, the overall lapping torque TG of the gear 30 changes as shown in the graph of FIG. 6. It will be understood from this graph that the overall lapping torque TG is minimum as indicated at $Ta_1$, $Ta_2$, which correspond to the points $a_1$, $a_2$ of the rotating angle $\theta G$ which are most distant from the two-dot chain line of FIG. 2 in the upward direction, while the lapping torque TG is maximum as indicated at $Tb_1$, $Tb_2$, which correspond to the points $b_1$, $b_2$ of the rotating angle $\theta G$ which are most distant from the two-dot chain line of FIG. 2 in the downward direction.

In the conventional lapping method, the overall lapping torque TG of the gear 30 is minimum when the cumulative pitch error amount of the pinion 10 is maximum, whereby the surface pressure of the contacting teeth of the pinion and gear 10, 30 tends to decrease with an increase in the cumulative pitch error amount. Conversely, the lapping torque TG is maximum when the cumulative pitch error amount is minimum, whereby the surface pressure of the contacting gear teeth tends to increase with a decrease in the cumulative pitch error amount. As a result, the cumulative pitch error tends to increase as the lapping operation on the pinion 10 and gear 30 progresses.

Figure 3:
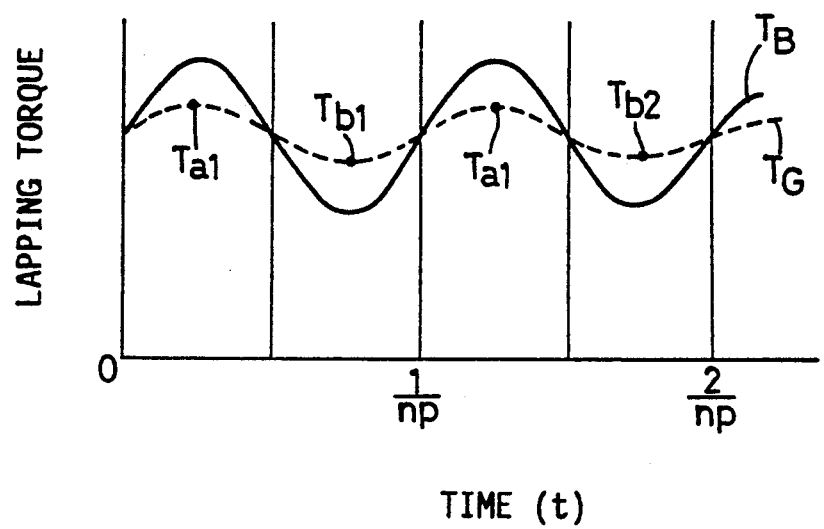
FIG. 3 is a graph showing a relationship between a braking torque and an overall lapping torque, in one embodiment of the lapping method of the present invention.

In the lapping method according to the present embodiment, the braking device 44 is controlled by the control device 40 so that the braking torque TB is controlled as shown in FIG. 3, so that the braking torque TB is maximum when the angular acceleration value of the gear 30 is at a minimum as indicated at $a_1$, $a_2$ in FIG. 2, and so that the braking torque TB is at a minimum when the angular acceleration value of the gear 30 is at a maximum as indicated at $b_1$, $b_2$ in FIG. 2. More specifically, the angular acceleration value $d^2\theta G/dt^2$ of the gear 30 is calculated by the control device 40, based on the output signal of the sensor 36, and the braking torque TB as indicated in FIG. 3 is calculated from the calculated angular acceleration value, so that the braking device 44 is controlled to produce the calculated braking torque TB. Consequently, the overall lapping torque TG of the gear 30 is at a maximum for the circumferential toothed portion of the gear 30 corresponding to the points $a_1$ and $a_2$, and is at a minimum for the circumferential toothed portion corresponding to the points $b_1$ and $b_2$.

Accordingly, the overall lapping torque TG is maximum when the cumulative pitch error amount of the pinion 10 is maximum, whereby the surface pressure of the contacting teeth of the pinion and gear 10, 30 is increased to increase the lapping depth as the cumulative pitch error amount increases. Conversely, the lapping torque TG is minimum when the cumulative pitch error amount is minimum, whereby the surface pressure of the contacting teeth is reduced to reduce the lapping depth as the cumulative pitch error amount decreases. Consequently, the pitch error of the pinion 10 after the lapping is reduced from that before the lapping.

Since the cumulative pitch error of the pinion 10 decreases as the lapping operation proceeds, the amount of change in the rotating angle $\theta G$ of the gear 30 decreases, and the amount of change in the braking torque TB controlled by the control device 40 decreases, and the braking torque TB eventually becomes constant, i.e., before the lapping operation is terminated.

It is possible that a pattern of change in the braking torque TB (relationship between the phase of the gear 30 and the braking torque TB) is determined depending upon the measured rotating angle θG of the gear 30, and the braking torque TB is controlled according to the determined pattern for a predetermined time duration or by the end of the lapping operation. While the determined pattern is maintained, the calculation of the rotating angle θG is not effected by the control device 40. The time duration for which the determined pattern is maintained may be determined to be sufficient for eliminating the cumulative pitch error as calculated from the detected rotating angle θG. Alternatively, the time duration may be a predetermined duration. In this case, it is desirable that the time duration be determined shorter than the time duration necessary for eliminating the cumulative pitch error, and the lapping operation be subsequently performed according to another pattern of change in the braking torque TB, which is newly determined based on the rotating angle θG detected a suitable time after the end of the lapping according to the first pattern.

Figure 4:
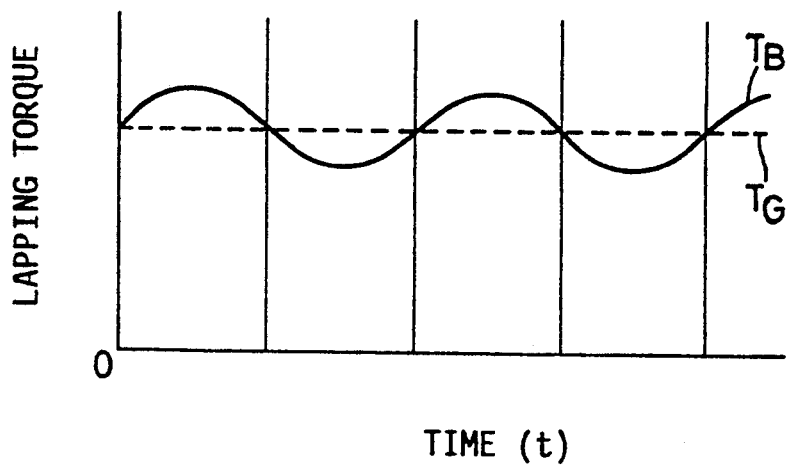
FIG. 4 is a graph showing a relationship similar to that of FIG. 3, in another embodiment of the invention.

While the present embodiment illustrated in FIG. 3 is adapted to control the braking torque TB for changing the overall lapping torque TG of the gear 30 following a periodic change in the angular acceleration value of the gear 30, the braking torque TB may be controlled so that the overall lapping torque TG is held constant, as indicated in FIG. 4. This modified embodiment prevents an increase in the cumulative pitch error of the pinion 10 as the lapping operation progresses.

Figure 5:
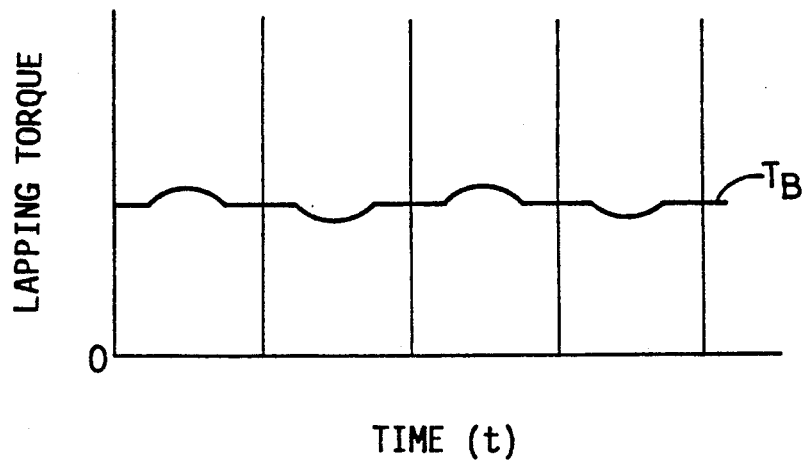
FIG. 5 is a graph showing a change in the braking torque controlled according to a further embodiment of the invention.

A further modified embodiment of this invention is illustrated in FIG. 5, in which the braking torque TB is increased when the angular velocity or acceleration value exceeds a predetermined upper limit, and decreased when the angular velocity or acceleration value is lowered below a predetermined lower limit.

In the illustrated embodiments, the braking torque TB is controlled so that the overall lapping torque TB of the gear 30 changes in phase with the change in the rotating angle θG of the gear 30. For reducing the cumulative pitch error, however, it may be better to perform the lapping operation with a given phase difference between the changes of the angle θG and torque TG.

While the sensor 36 is used in the illustrated embodiments for detecting the rotating angle of the gear 30, the sensor 36 may be replaced by a sensor for directly detecting the angular velocity or angular acceleration value of the gear.

Although the illustrated embodiments have been described on the assumption that only the pinion 10 has an eccentricity error, the principle of the present invention is also effective to prevent an increase in or reduce the cumulative pitch error, where only the gear 30 has or both of the pinion 10 and the gear 30 have an eccentricity error, or any other geometrical or dimensional error.

It is to be understood that the present invention may be embodied with various other changes, modifications and improvements, which may occur to those skilled in the art, in the light of the foregoing teachings.

What is claimed is:

1. A method of lapping teeth of a pair of gears by positively rotating one of said pair of gears in mesh with the other gear in the presence of a lapping powder, while applying a braking torque to said other gear, said method comprising the steps of:

obtaining an angular acceleration value of said other gear while said one gear is rotated at a predetermined constant speed; and controlling said braking torque such that said braking torque is smaller when said angular acceleration value obtained from said other gear is at a maximum, than when said angular acceleration value obtained from said other gear is at a minimum.

2. A method according to claim 1, wherein said step of controlling said braking torque comprises decreasing said braking torque with an increase in said angular acceleration value of said other gear.

3. A method according to claim 2, wherein said step of controlling said braking torque comprises controlling said braking torque so as to produce a counter torque, said counter torque changing with an inertial torque due to a moment of inertia of said other gear, such that an amount of change of said counter torque is equal to an amount of change of said inertial torque while a direction of change of said counter torque is opposite to a direction of change of said inertial torque.

4. A method according to claim 2, wherein said step of controlling said braking torque comprises controlling said braking torque so as to offset a change of an inertial torque due to a moment of inertia of said other gear.

5. A method according o claim 1, wherein said step of controlling said braking torque comprises controlling said braking torque so as to produce a counter torque, said counter torque changing with an inertial torque due to a moment of inertia of said other gear, such that a direction of change of said counter torque is opposite to a direction of change of said inertial torque.

6. A method according to claim 1, wherein said step of controlling said braking torque comprises determining a pattern of change in said braking torque, and maintaining said pattern of change for at least a predetermined time duration.

7. A method according to claim 1, wherein said step of controlling said braking torque comprises decreasing said braking torque when said angular acceleration value of said other gear exceeds a predetermined upper limit, and increasing said braking torque when said angular acceleration value of said other gear decreases below a predetermined lower limit.

8. A method according to claim 1, wherein said step of controlling said braking torque comprises decreasing said braking torque by a predetermined first amount when said angular acceleration value of said other gear exceeds a predetermined upper limit, and increasing said braking torque by a predetermined second amount when said angular acceleration value of said other gear decreases below a predetermined lower limit.

9. A method according to claim 1, wherein said step of controlling said braking torque comprises decreasing said braking torque by an amount proportional to said angular acceleration value of said other gear when said angular acceleration value of said other gear exceeds a predetermined upper limit, and increasing said braking torque by an amount proportional to said angular acceleration value when said angular acceleration value decreases below a predetermined lower limit.

10. A method according to claim 1, wherein said step of obtaining an angular acceleration value of said other gear comprises detecting a rotating angle of said other gear, and calculating said angular acceleration value by obtaining a second derivative of said detected rotating angle of said other gear, with respect to time.

11. An apparatus for lapping teeth of a pair of gears, comprising:
- a lapping device including (i) support means for rotatably supporting said pair of gears in mesh with each other, (ii) drive means for positively rotating one of said pair of gears at a predetermined constant speed, (iii) braking means for applying a braking torque to the other of said pair of gears, and (iv) supply means for supplying a lapping powder between the teeth of said pair of gears;
- an acceleration sensor provided on said lapping machine to obtain a signal relating to an angular acceleration value of said other gear while said one gear is rotated at said predetermined constant speed, and to determine said angular acceleration value on the basis of said signal; and
- a controller connected to said acceleration sensor and said braking means of said lapping device, said controller including (a) determining means for determining said braking torque on the basis of said angular acceleration value determined by said acceleration sensor, such that said braking torque is smaller at times when said angular acceleration value is at a maximum than at times when said angular acceleration value is at a minimum, and (b) control means for controlling said braking means of said lapping device to control said braking torque in accordance with the braking torque determined by said controller.

12. An apparatus according to claim 11, wherein said acceleration sensor comprises detecting means for detecting a rotating angle of said other gear, and calculating means for calculating said angular acceleration value by obtaining a second derivative of said detected rotating angle of said other gear, with respect to time.

13. An apparatus according to claim 12, wherein said calculating means of said acceleration sensor and said determining means of said controller are provided by a computer and connected to said control mans to which said braking means of said lapping device is connected.

* * * * *

UNITED STATES PATENT AND TRADEMARK OFFICE
CERTIFICATE OF CORRECTION

PATENT NO. : 5,299,390
DATED : April 5, 1994
INVENTOR(S) : Shogo KATO et al.

It is certified that error appears in the above-indentified patent and that said Letters Patent is hereby corrected as shown below:

Claim 13, column 10, line 19, change "mans" to --means--.

Signed and Sealed this

Twenty-second Day of November, 1994

Attest:

BRUCE LEHMAN

*Attesting Officer*    *Commissioner of Patents and Trademarks*